US012715239B2

(12) United States Patent
Hanks et al.

(10) Patent No.: US 12,715,239 B2
(45) Date of Patent: Aug. 25, 2026

(54) TRIANGLE CHOCKY BAR FOR USE ON COMPACTOR WHEEL WIRE GUARDS

(71) Applicant: Caterpillar Inc., Peoria, IL (US)

(72) Inventors: Kevin Hanks, Piedmont, SD (US); Jim D. Angell, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 324 days.

(21) Appl. No.: 18/383,651

(22) Filed: Oct. 25, 2023

(65) Prior Publication Data

US 2025/0135801 A1 May 1, 2025

(51) Int. Cl.
*B60B 15/02* (2006.01)
*E02D 3/026* (2006.01)

(52) U.S. Cl.
CPC .......... *B60B 15/025* (2013.01); *E02D 3/0265* (2013.01); *B60B 2900/551* (2013.01)

(58) Field of Classification Search
CPC ............ B60B 15/025; B60B 2900/551; B60B 2900/721; E02D 3/026; E02D 3/0265; E01C 19/26
USPC .......................................................... 301/143
See application file for complete search history.

(56) References Cited

U.S. PATENT DOCUMENTS 1,423,519 A * 7/1922 Farkas .................... B60B 15/24 301/44.3
3,598,028 A * 8/1971 Grant ...................... E02D 3/026 404/121
5,769,507 A * 6/1998 Brockway ............... E02D 3/026 172/554
8,807,669 B2 * 8/2014 McPhail ................... B60B 7/04 301/43
11,268,251 B1 * 3/2022 McCartney ............ B22D 19/16
11,499,283 B2 * 11/2022 Pierce ..................... B60B 15/02
2007/0280783 A1 * 12/2007 Gibbins .................. E02D 3/026 404/124
2014/0062166 A1 * 3/2014 Crystal ................. E02D 3/0265 301/43
2018/0202114 A1 * 7/2018 Burger .................... E01C 19/23

FOREIGN PATENT DOCUMENTS

WO WO-2012125907 A1 * 9/2012 ............ E02D 3/026

* cited by examiner

*Primary Examiner* — S. Joseph Morano
*Assistant Examiner* — Eva L Comino

(57) ABSTRACT

Mobile equipment, such as landfill compactors, utilize wheels with wire guards to prevent wire, cable, or the like from entangling the mobile equipment. Traditional wire guards either do not satisfy life expectations or do not provide an edge that promotes chopping or cutting of refuse and/or traction. The disclosed wire guard comprises one or more chocky bars, extending between pairs of adjacent cleats on the peripheral edge of a circumferential surface of a wheel rim. This wire guard may improve the life of the wire guard system to match the life of the cleats, while also providing a serrated edge that improves chopping and cutting of refuse and provides traction on the varied and unpredictable terrain of a landfill.

17 Claims, 4 Drawing Sheets

TRIANGLE CHOCKY BAR FOR USE ON COMPACTOR WHEEL WIRE GUARDS

TECHNICAL FIELD

The embodiments described herein are generally directed to compactor wheels, and, more particularly, to triangular chocky bars for use on the wire guards of a wheel on a landfill compactor.

BACKGROUND

In some industrial contexts, mobile equipment is at risk of becoming entangled in wire, cable, and/or other types of long, thin materials. One example is the use of a landfill compactor within a landfill.

Landfills include vast quantities of refuse of varied shape, size, weight, texture, and the like. Landfill compactors move the refuse around the landfill to more evenly distribute the refuse and otherwise process the refuse, prior to covering the refuse with soil. In addition, landfill compactors compact and break down the refuse into smaller pieces to facilitate space usage and lessen the time required for disintegration, biodegradation, and dissolution of the refuse.

A landfill compactor generally includes four or more wheels. Each wheel comprises a metal rim from which a plurality of spaced and elongated tips or cleats protrude. The wheels are designed to dig deeply into the refuse to provide the traction necessary to navigate the varied and unpredictable terrain of the landfill, as well as chop or otherwise break down the refuse during movement of the landfill compactor.

One particular challenge, faced by landfill compactors, is the prevention or abatement of refuse being entangled around the axles of the wheels. This is particularly true of long, thin refuse, such as wire, cable, or the like that may wrap around the axle or get trapped between the side edge of a wheel and a portion of the wheel-well or chassis of the landfill compactor. Such entanglement may lock a wheel in position, which may potentially cripple or otherwise disrupt operation of the landfill compactor, as well as decrease efficiency and increase fuel consumption.

One solution to such entanglement is the placement of wire guards on a peripheral edge (e.g., inboard peripheral edge) of the wheel rims of the landfill compactor. For example, U.S. Pat. No. 11,499,283 describes a wheel guard that comprises two guard members, positioned between each pair of adjacent cleats on the periphery of the wheel rim. The guard members are coupled to each other via corresponding stepped recesses, and a base plate and wear pad are coupled to the top surface of each stepped recess. The present disclosure is directed toward overcoming one or more of the problems discovered by the inventors.

SUMMARY

In an embodiment, a wire guard comprises one or more chocky bars, wherein each of the one or more chocky bars comprises: a triangular tooth comprising a pair of triangular side surfaces, a top surface, and a bottom surface; and a rectangular attachment plate comprising a top surface and a flat bottom surface, wherein the top surface of the rectangular attachment plate is brazed to the bottom surface of the triangular tooth.

In an embodiment, a wheel comprises: a rim comprising a circumferential surface that is annular around a longitudinal axis; a plurality of cleats affixed to the circumferential surface of the rim, so as to protrude from the circumferential surface of the rim, wherein a subset of the plurality of cleats are arranged at equidistant intervals around the longitudinal axis on a peripheral edge of the circumferential surface of the rim; and a plurality of wire guards that each comprises a base comprising a circumferential surface and a bottom surface opposite the circumferential surface, wherein the circumferential surface of the base comprises a plurality of flat portions arranged, along a circumferential axis, from a first end of the base to a second end of the base that is opposite the first end, and a plurality of chocky bars, wherein each of the plurality of chocky bars comprises a triangular tooth comprising a pair of triangular side surfaces, a top surface, and a bottom surface, wherein the top surface comprises a first portion inclined in a first direction and a second portion inclined in a second direction that is opposite the first direction, and wherein an interface between the first portion and the second portion is beveled, and a rectangular attachment plate comprising a top surface and a flat bottom surface, wherein the top surface of the rectangular attachment plate is brazed to the bottom surface of the triangular tooth, wherein the flat bottom surface of the rectangular attachment plate of each of the plurality of chocky bars is affixed to a respective one of the plurality of flat portions of the circumferential surface of the base, and wherein the bottom surface of the base of each of the plurality of wire guards is affixed to the circumferential surface of the rim between a respective pair of adjacent cleats in the subset of cleats.

In an embodiment, a wire-guard kit for a compactor wheel comprises: a base comprising a circumferential surface, wherein the circumferential surface comprises a plurality of flat portions arranged from a first end of the base to a second end of the base that is opposite the first end; and a plurality of chocky bars, wherein each of the plurality of chocky bars comprises a triangular tooth comprising a pair of triangular side surfaces, a top surface, and a bottom surface, wherein the top surface comprises a first portion inclined in a first direction and a second portion inclined in a second direction that is opposite the first direction, and wherein an interface between the first portion and the second portion is beveled, and a rectangular attachment plate comprising a top surface and a flat bottom surface, wherein the top surface of the rectangular attachment plate is brazed to the bottom surface of the triangular tooth.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
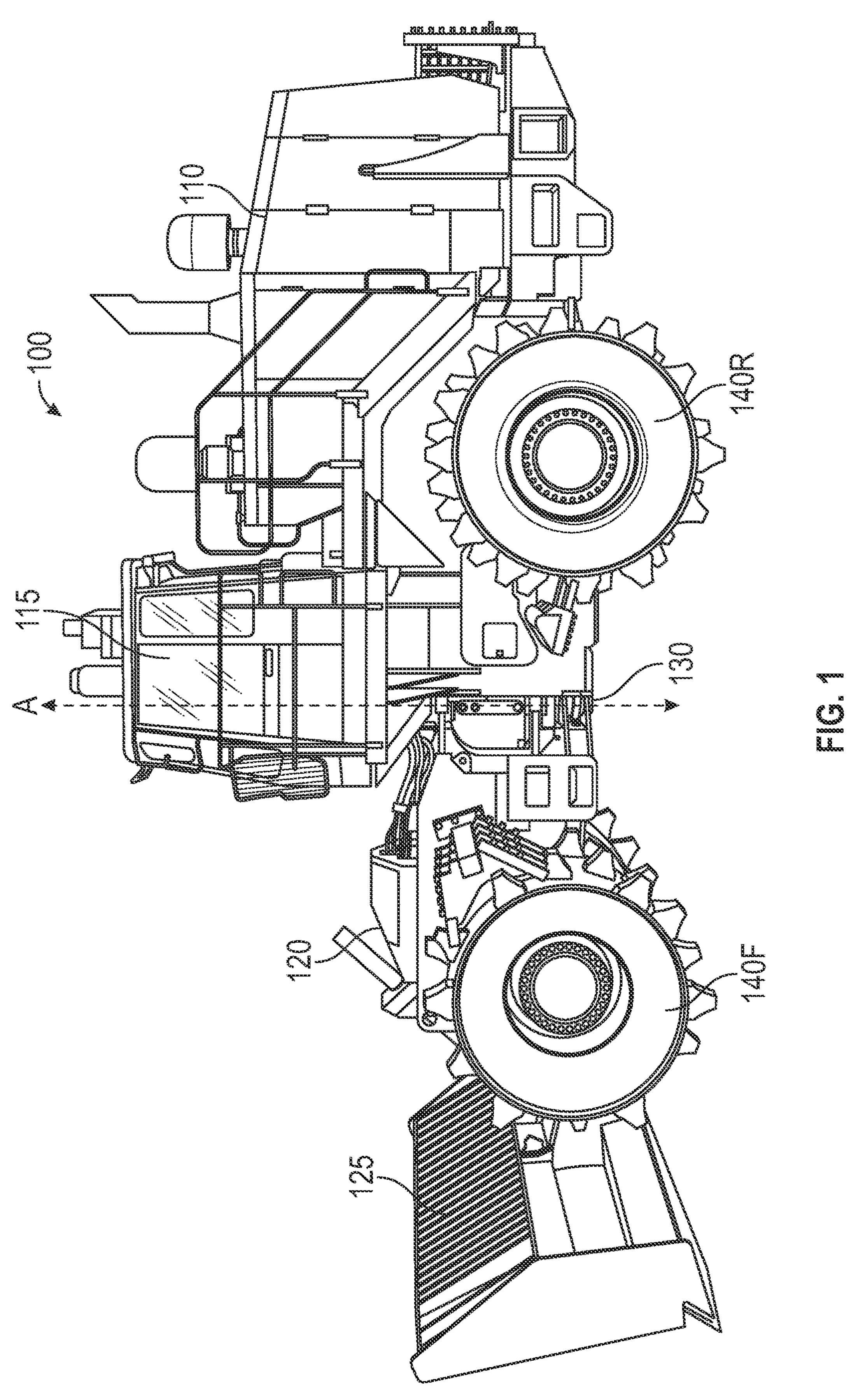
FIG. 1 illustrates an example of a mobile equipment, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

As used herein, the terms “side,” “top,” “bottom,” “front,” “rear,” “above,” “below,” and the like are used for convenience of understanding to convey the relative positions of various components with respect to each other, and do not imply any specific orientation of those components in absolute terms (e.g., with respect to the external environment or the ground). In addition, the terms “respective” and “respectively” signify an association between members of a group of first components and members of a group of second components. For example, the phrase “each component A connected to a respective component B” would signify A1 connected to B1, A2 connected to B2, . . . and AN connected to BN.

FIG. 1 illustrates an example of a mobile equipment 100, according to an embodiment. It is generally contemplated that mobile equipment 100 will be a landfill compactor. Examples of landfill compactors include, without limitation, models 816, 826K, 836, and 836K of the landfill compactors offered by Caterpillar Inc. of Irving, Texas. However, the disclosed embodiments may be utilized with any mobile equipment 100 that would benefit from a wire guard.

In the illustrated example, mobile equipment 100 is an articulated landfill compactor that comprises a rear portion 110, which includes a cab 115, and a front portion 120, which includes a work-tool 125. In the illustrated example, work-tool 125 comprises a blade that is used to move (e.g., push) refuse around a landfill.

Front portion 120 is articulated with respect to rear portion 110, such that front portion 120 is capable of rotating within a range of degrees, relative to rear portion 110, around an axis A, by virtue of a joint 130. However, it should be understood that disclosed embodiments do not require mobile equipment 100 to comprise an articulated front portion 120. In an alternative example, mobile equipment 100 may comprise non-articulated front and rear portions (e.g., a single, integrated body frame).

Of particular relevance to the present disclosure, mobile equipment 100 comprises one or more wheels 140. Generally, mobile equipment 100 will comprise a plurality of wheels 140, such as four or more wheels 140, including a pair of front wheels 140F and a pair of rear wheels 140R. Each wheel 140 may be identical, or one or more wheels 140 may differ from one or more other wheels 140.

As used herein, a reference numeral with an appended letter will be used to refer to a specific component, whereas the same reference numeral without any appended letter will be used to refer collectively to a plurality of the component or to refer to a generic or arbitrary instance of the component. Thus, for example, the term “wheel 140” refers collectively to front wheels 140F and rear wheels 140R, and the term “wheel 140” may refer to any single one of a front wheel 140F or rear wheel 140R.

Figure 2:
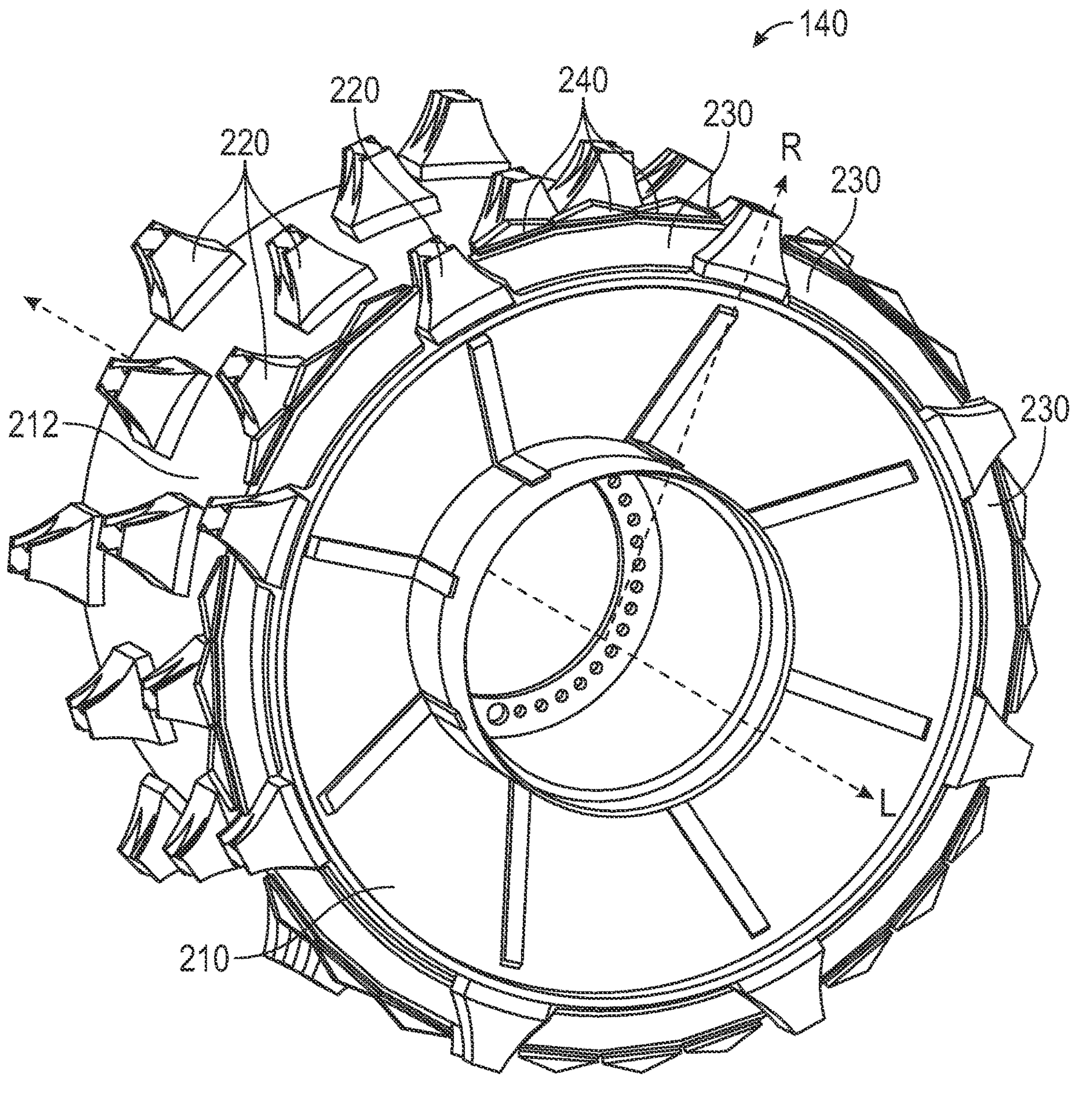
FIG. 2 illustrates a perspective view of a single wheel of a mobile equipment in isolation, according to an embodiment.

FIG. 2 illustrates a perspective view of a single wheel 140 of mobile equipment 100 in isolation, according to an embodiment. In this particular view, wheel 140 is being viewed from an inboard side. Wheel 140 comprises a rim 210, which may be affixed to an axle (e.g., front or rear axle) of mobile equipment 100 via standard fastening means (e.g., nuts and bolts). Rim 210 is annular around a longitudinal axis L, so as to have a generally cylindrical shape. Rim 210 has a circumferential surface 212, which is radially outward-facing (i.e., facing away from longitudinal axis L, along a radial axis R that is perpendicular to longitudinal axis L) and annular around longitudinal axis L.

A plurality of cleats 220 are affixed to circumferential surface 212 of rim 210, such that each cleat 220 protrudes radially, along a radial axis R, from a position on circumferential surface 212 of rim 210. Cleats 220 may be made from white iron, which is cast iron having most or all of its carbon in the form of cementite. Cleats 220 may be affixed to circumferential surface 212 via welding, brazing, soldering, fasteners, or other means.

Cleats 220 may be positioned on circumferential surface 212 according to any suitable pattern. For example, cleats 220 may be positioned in a helical pattern, such that a plurality of annular sets of cleats 220 are arranged at one or more longitudinal positions, along longitudinal axis L. Each annular set of cleats 220 at each longitudinal position comprises a plurality of cleats arranged at equidistant intervals annularly around longitudinal axis L. In addition, each annular set of cleats 220 may be offset from at least each adjacent annular set of cleats 220, and preferably from every other annular set of cleats 220 around circumferential surface 212. In the illustrated embodiment, there are four annular sets of cleats 220, including two annular sets of cleats 220 on opposing peripheral edges of circumferential surface 212 of rim 210, and each annular set of cleats 220 is offset from every other annular set of cleats 220 in a rotational direction around longitudinal axis L.

As mentioned above, a subset of the plurality of cleats 220 may be arranged at equidistant intervals around longitudinal axis L on a peripheral edge of circumferential surface 212 of rim 210. Wheel 140 may also comprise a plurality of wire guards. Each of the plurality of wire guards may be affixed to circumferential surface 212 of rim 210 between a respective pair of adjacent cleats 220 in the subset of cleats 220 on the peripheral edge of circumferential surface 212. Each wire guard extends circumferentially around circumferential surface 212 of rim 210 from one of the respective pair of adjacent cleats 220 to the other one of the respective pair of adjacent cleats 220. It is generally contemplated that the wire guards would only be installed on the inboard peripheral edge of circumferential surface 212 of rim 210. However, alternatively, wire guards could be installed only on the outboard peripheral edge, or on both the inboard and outboard peripheral edges of circumferential surface 212 of rim 210.

Each wire guard may comprise a base 230. In the illustrated embodiment, each wire guard consists of a single base 230, which consists of a single piece. Base 230 may be formed from cast steel.

Each wire guard may comprise one or more chocky bars 240, and preferably, a plurality of chocky bars 240. In the illustrated embodiment, each wire guard comprises or consists of three chocky bars 240. However, each wire guard could consist of fewer or more chocky bars 240, including one, two, or four or more chocky bars 240. Although, chocky bars 240 could contact and/or be connected to each adjacent chocky bar 240 in the wire guard, in a preferred embodiment, there is a space between each adjacent chocky bar 240.

Figure 3:
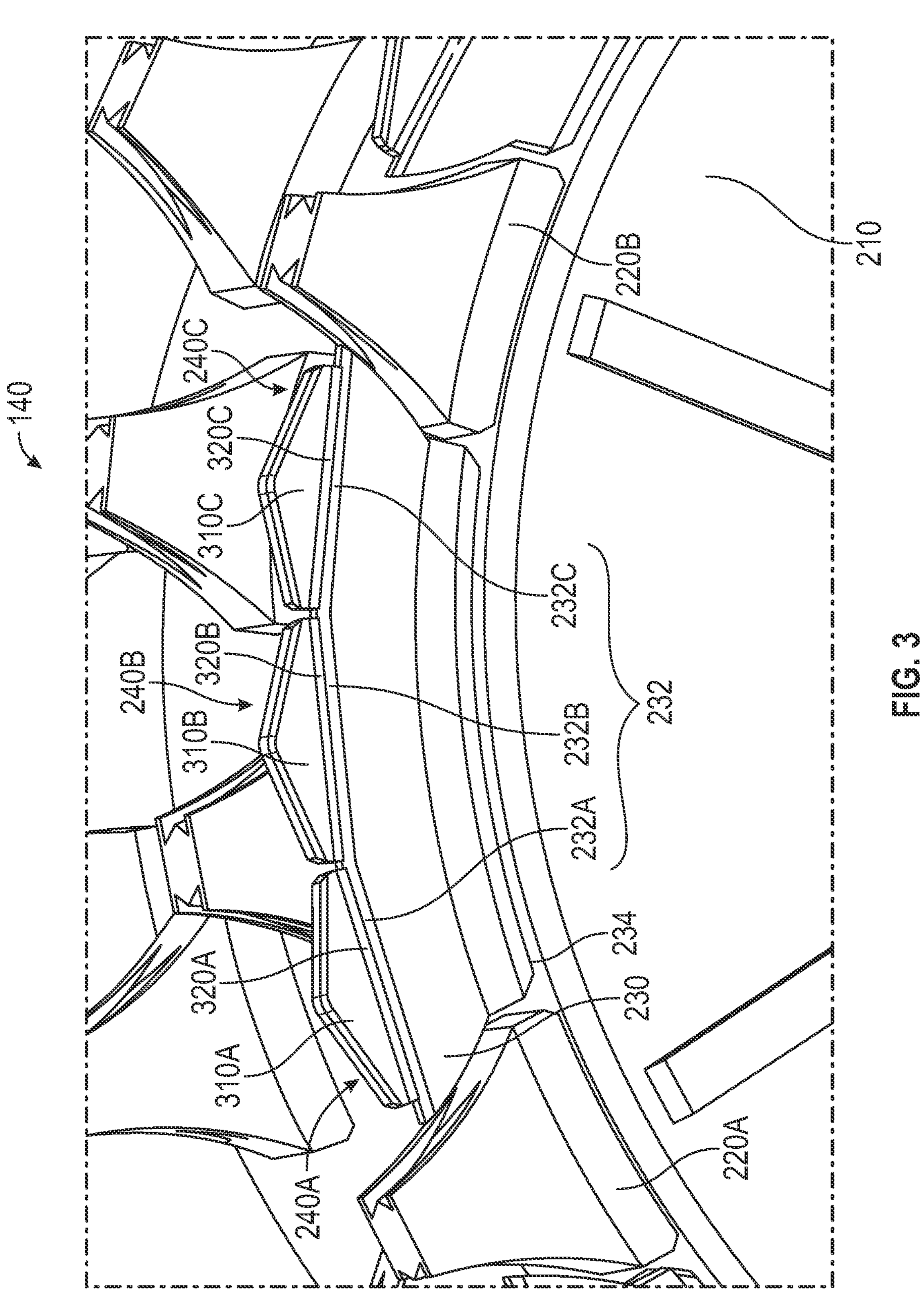
FIG. 3 illustrates a closeup view of a wire guard on a wheel, according to an embodiment.

FIG. 3 illustrates a closeup view of a wire guard on a wheel 140, according to an embodiment. In the illustrated embodiment, each wire guard comprises or consists of a single-piece base 230 and three chocky bars 240. Base 230 extends between a pair of adjacent cleats 220A and 220B in the subset of cleats on at least one peripheral edge (e.g., inboard peripheral edge) of circumferential surface 212 of rim 210. Base 230 may be affixed to circumferential surface 212 of rim 210 via welding, brazing, soldering, fasteners, or other means. Each end of base 230 may or may not contact a respective side of one of the pair of adjacent cleats 220A and 220B. In the case that there is contact, each end of base 230 may be affixed to the respective side of a respective one of the pair of adjacent cleats 220A and 220B via welding, brazing, soldering, fasteners, or other means. Base 230 has a circumferential surface 232, which is radially outward-facing (i.e., facing away from longitudinal axis L, along a radial axis R that is perpendicular to longitudinal axis L).

Circumferential surface 232 of base 230 may comprise one or more, and generally a plurality of, flat portions, illustrated as portions 232A, 232B, and 232C, arranged along a circumferential axis C that is perpendicular to longitudinal axis L and radial axis R, from a first end of base 230 to a second end of base 230 that is opposite the first end. It should be understood that the number of flat portions of circumferential surface 232 may correspond to the number of chocky bars 240 in the wire guard. For instance, if the wire guard consists of three chocky bars 240A, 240B, and 240C, base 230 will consist of three flat portions 232A, 232B, and 232C. Each chocky bar 240 comprises a flat bottom surface that is affixed to a respective flat portion of circumferential surface 232 of base 230. For example, chocky bar 240A is affixed to flat portion 232A, chocky bar 240B is affixed to flat portion 232B, and chocky bar 240C is affixed to flat portion 232C. Each chocky bar 240 may be affixed to circumferential surface 232 of base 230 via welding, brazing, soldering, fasteners, or other means. The flat bottom surfaces of chocky bars 240 sit flush with their respective flat portions, when chocky bars 240 are affixed to circumferential surface 232 of base 230. The flat portions of circumferential surface 232 of base 230 enable chocky bars 240 to be manufactured with flat bottom surfaces, which may be easier than manufacturing chocky bars 240 with curved bottom surfaces.

In contrast to circumferential surface 232 of base 230, a bottom surface 234 of base 230 may be curved to match the curvature of circumferential surface 212 of rim 210. This enables base 230 to sit flush with circumferential surface 212, along the entire length of bottom surface 234, when base 230 is affixed to circumferential surface 212. Notably, the flat portions (e.g., 232A, 232B, and 232C) of circumferential surface 232 may be oriented to generally follow the curvature of bottom surface 234. For example, an imaginary curve through the vertices between each flat portion may match the curvature of bottom surface 234.

In each wire guard, one or more, and preferably a plurality of, chocky bars 240 are affixed to circumferential surface 232 of base 230, such that each chocky bar 240 protrudes radially, along a radial axis R, from base 230 at a different circumferential position around longitudinal axis L. Each end of each chocky bar 240 that is adjacent to another chocky bar 240 may or may not contact that adjacent chocky bar 240. In the illustrated embodiment, adjacent chocky bars 240 do not contact each other, such that there is a space between each pair of adjacent chocky bars 240. However, in an alternative embodiment, there may be no space between each pair of adjacent chocky bars 240, such that each pair of adjacent chocky bars 240 are in contact, and optionally, may be affixed to each other at each point of contact (e.g., via welding, brazing, soldering, fasteners, or other means).

Each chocky bar 240 comprises a triangular tooth 310 and a rectangular attachment plate 320. For example, chocky bar 240A comprises tooth 310A and attachment plate 320A, chocky bar 240B comprises triangular tooth 310B and attachment plate 320B, and chocky bar 240C comprises triangular tooth 310C and attachment plate 320C.

Each attachment plate 320 may comprise a top (i.e., radially outward facing) surface and a bottom (i.e., radially inward facing) surface, as well as four rectangular side surfaces. The bottom surface of attachment plate 320 may be flat. The top surface of an attachment plate 320 may be brazed to a bottom (i.e., radially inward facing) surface of a respective triangular tooth 310, in a vacuum state, to produce a single chocky bar 240. The bottom surface of attachment plate 320 of each chocky bar 240 may then be welded to circumferential surface 232 of base 230, to thereby affix chocky bar 240 to base 230.

In an embodiment, each triangular tooth 310 is formed from white iron, such as American Society for Testing and Materials (ASTM) A532 Class II Type B high chromium white iron (e.g., with a Rockwell hardness of C60 or greater). Base 230 may be formed from cast steel. Attachment plate 320 may be made of any suitable material that enables both brazing between the top surface of attachment plate 320 and the bottom surface of triangular tooth 310 and welding between the bottom surface of attachment plate 320 and circumferential surface 232 of base 230. For example, attachment plate 320 may be formed from carbon steel. The sheer strength between triangular tooth 310 and attachment plate 320 may be 140 megapascals (MPa) or greater. It should be understood that these are non-limiting examples, and that the components of each wire guard may be formed from other materials and/or with other attributes.

Figure 4A:
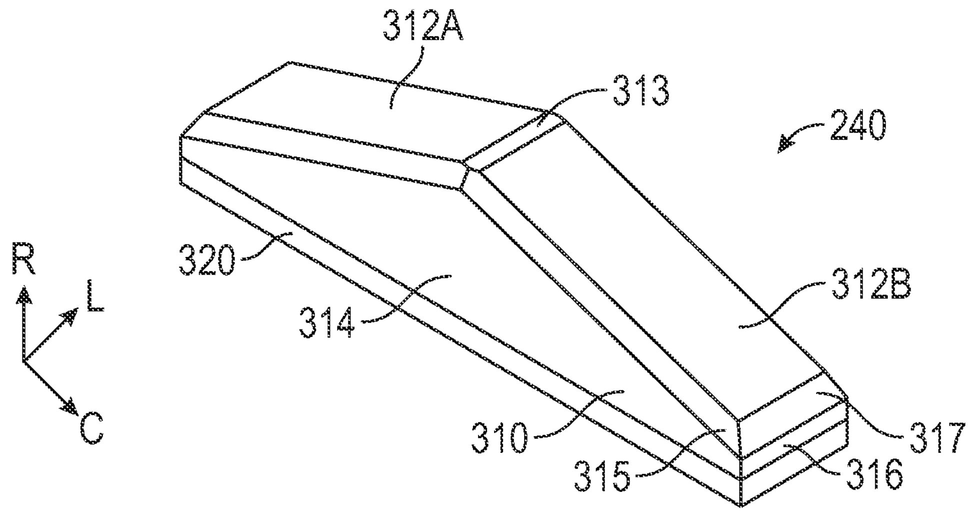
FIGS. 4A-4C illustrate various views of a single chocky bar of a wire guard in isolation, according to an embodiment.

FIG. 4A illustrates a perspective view of a single chocky bar 240 of a wire guard in isolation, according to an embodiment. As illustrated, the bottom surface of triangular tooth 310 is brazed to the top surface of attachment plate 320. Triangular tooth 310 has a top (i.e., radially outward facing) surface 312, consisting of a first portion 312A and a second portion 312B, which are both inclined with respect to a circumferential axis C, which is perpendicular to longitudinal axis L and radial axis R. In particular, first portion 312A is inclined in a first direction, and second portion 312B is inclined in a second direction that is opposite the first direction. Triangular tooth 310 also has a pair of triangular side surfaces 314 on opposing sides of triangular tooth 310, along longitudinal axis L, as well as a pair of rectangular end surfaces 316 on opposing ends of triangular tooth 310, along circumferential axis C. Each rectangular end surface 316 extends perpendicularly (i.e., along longitudinal axis L) between a respective pair of radially oriented edges of the pair of triangular side surfaces 314.

Triangular tooth 310 may comprise beveling to remove sharp corners or points. For example, the interface between first portion 312A and second portion 312B of top surface 312 may be beveled to produce a top beveled region 313, which is substantially flat. In addition, the interfaces between top surface 312 and each of the pair of triangular side surfaces 314 may be beveled to produce a pair of side beveled regions 315. Similarly, the interfaces between top surface 312 and each of the pair of rectangular end surfaces 316 may be beveled to produce a pair of end beveled regions 317. The beveling eliminates stress points, which could otherwise cause portions of triangular tooth 310 to break during operation of mobile equipment 100.

Figure 4B:
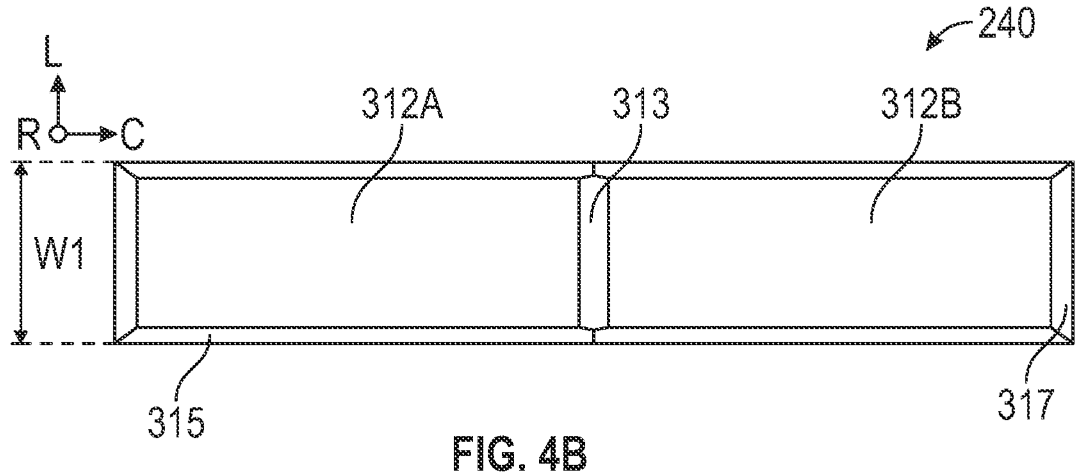

FIG. 4B illustrates a top-down view of a single chocky bar 240 of a wire guard in isolation, according to an embodiment. As illustrated, chocky bar 240 has a width W1 along longitudinal axis L. As an example, width W1 may be between 25-50 millimeters, and in a particular embodiment, width W1 may be 38 millimeters. However, it should be understood that width W1 may have other values, as may be dictated by design parameters, such as the dimensions of wheel 140, the dimensions of cleats 220, the space between cleats 220, the dimensions of base 230, and/or the like.

Figure 4C:
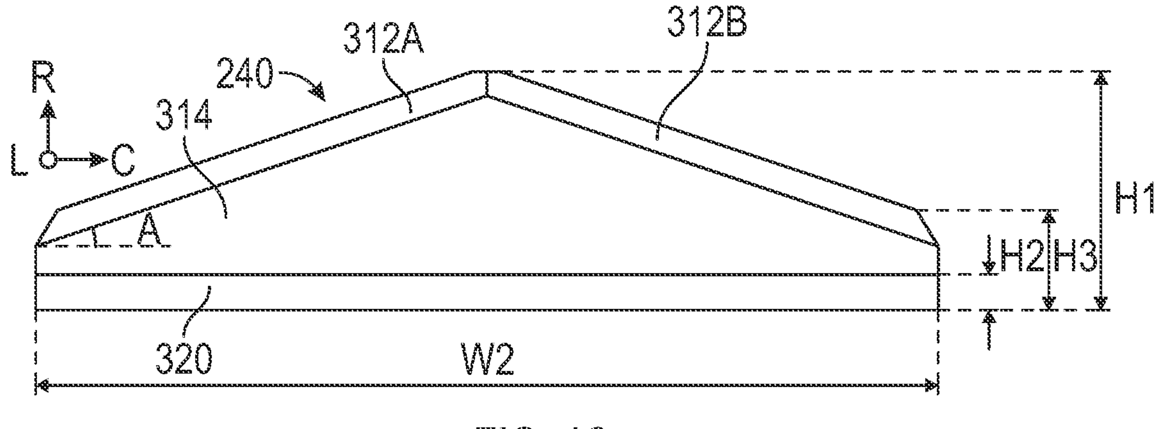

FIG. 4C illustrates an elevated side view of a single chocky bar 240 of a wire guard in isolation, according to an embodiment. Each portion 312A and 312B of top surface 312 may be inclined, with respect to circumferential axis C, in opposite directions, by an angle A. Angle A may be between 15-35 degrees, and in a particular embodiment, angle A may be 25 degrees. Chocky bar 240 has a width W2 along circumferential axis C, and a height H1 along radial axis R, which includes height H2 of attachment plate 320 and height H3 from the bottom surface of attachment plate 320 to the top edge of rectangular end surface 316. As one example, width W2 may be 150-250 millimeters (e.g., 200 millimeters), height H1 may be 45-60 millimeters (e.g., 53 millimeters), height H2 of attachment plate 320 may be 5-10 millimeters (e.g., 8 millimeters), and height H3 may be 15-30 millimeters (e.g., 22 millimeters). However, it should be understood that any of these dimensions may have other values, as may be dictated by one or more design parameters.

In an embodiment, height H1 of each chocky bar 240 may be set, such that the total height of base 230 with an affixed chocky bar 240, along a radial axis R, above circumferential surface 212 of rim 210, is less than the height of a cleat 220 (e.g., by thirteen millimeters or more), along a radial axis R, above circumferential surface 212 of rim 210. In other words, in this embodiment, the height of each wire guard matches the height of cleats 220.

Industrial Applicability

Mobile equipment, such as landfill compactors, utilize wheels with wire guards to prevent wire, cable, or the like from entangling the mobile equipment. Traditional wire guards either do not satisfy life expectations or do not provide an edge that promotes chopping or cutting of refuse and/or traction.

The disclosed wire guards, comprising one or more chocky bars 240, between pairs of adjacent cleats 220 on the inboard peripheral edge of circumferential surface 212 of a rim 210 of a wheel 140, improve the wear life of the wire guard system, while also providing a serrated edge that improves chopping and cutting of refuse and provides traction. For example, the disclosed wire guards may increase the life of the wire guard system to match the life of cleats 220 (e.g., 15,000 operating hours). Thus, cleats 220 and the wire guards may be serviced (e.g., replaced) at the same time, and generally only chocky bars 240 of the wire guards will need to be replaced, thereby reducing maintenance costs and down-time.

While wheels 140 may be manufactured with the disclosed wire guards, any existing wheel with cleats on the peripheral edge of the circumferential surface of the rim may be retrofitted with the disclosed wire guards. For this purpose, a wire-guard kit may be provided for compactor wheels. This wire-guard kit may comprise a single wire guard or a plurality of wire guards, sufficient to fill the space between each adjacent pair of cleats 220 on a wheel 140. Each wire guard in the wire-guard kit may comprise base 230 and one or a plurality of chocky bars 240 sufficient to extend across the entire circumferential length of circumferential surface 232 of base 230.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a landfill compactor, it will be appreciated that it can be implemented in various other types of mobile equipment and machines with wire guards, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A wire guard comprising:
- a plurality of chocky bars, wherein each of the one or more chocky bars comprises:
  - a triangular tooth comprising a pair of triangular side surfaces, a top surface, and a bottom surface; and
  - a rectangular attachment plate comprising a top surface and a flat bottom surface, wherein the top surface of the rectangular attachment plate is brazed to the bottom surface of the triangular tooth; and
- a base comprising a circumferential surface, wherein the circumferential surface of the base comprises a plurality of flat portions arranged, along a circumferential axis, from a first end of the base to a second end of the base that is opposite the first end, wherein the flat bottom surface of the rectangular attachment plate of each of the plurality of chocky bars is affixed to a respective one of the plurality of flat portions of the circumferential surface of the base.

2. The wire guard of claim 1, wherein the top surface of the triangular tooth of each of the plurality of chocky bars comprises a first portion inclined in a first direction and a second portion inclined in a second direction that is opposite the first direction.

3. The wire guard of claim 2, wherein an interface between the first portion and the second portion of the top surface of the triangular tooth of each of the plurality of chocky bars is beveled.

4. The wire guard of claim 1, wherein interfaces between the top surface and each of the pair of triangular side surfaces of the triangular tooth are beveled.

5. The wire guard of claim 1, wherein the triangular tooth of each of the plurality of chocky bars further comprises a pair of rectangular end surfaces that each extends perpendicularly between a respective pair of radially oriented edges of the pair of triangular side surfaces.

6. The wire guard of claim 1, wherein the wire guard comprises three or more chocky bars.

7. The wire guard of claim 1, wherein the wire guard consists of three chocky bars.

8. The wire guard of claim 1, wherein the base of the wire guard consists of a single base, and wherein the base consists of a single piece.

9. The wire guard of claim 1, wherein the base is formed from cast steel, and wherein the triangular tooth of each of the plurality of chocky bars is formed from white iron.

10. The wire guard of claim 9, wherein the rectangular attachment plate of each of the plurality of chocky bars is formed from carbon steel.

11. A wheel comprising:

a rim comprising a circumferential surface that is annular around a longitudinal axis;

a plurality of cleats affixed to the circumferential surface of the rim, so as to protrude from the circumferential surface of the rim, wherein a subset of the plurality of cleats are arranged at equidistant intervals around the longitudinal axis on a peripheral edge of the circumferential surface of the rim; and a plurality of the wire guard of claim 1, wherein a bottom surface of the base of each of the plurality of wire guards is affixed to the circumferential surface of the rim between a respective pair of adjacent cleats in the subset of cleats.

12. The wheel of claim 11, wherein the base of each of the plurality of wire guards extends circumferentially around the circumferential surface of the rim from one of the respective pair of adjacent cleats to another one of the respective pair of adjacent cleats.

13. A mobile equipment comprising a plurality of the wheel of claim 11.

14. The mobile equipment of claim 13, wherein the mobile equipment is a landfill compactor.

15. A wheel comprising:

a rim comprising a circumferential surface that is annular around a longitudinal axis;

a plurality of cleats affixed to the circumferential surface of the rim, so as to protrude from the circumferential surface of the rim, wherein a subset of the plurality of cleats are arranged at equidistant intervals around the longitudinal axis on a peripheral edge of the circumferential surface of the rim; and a plurality of wire guards that each comprises a base comprising a circumferential surface and a bottom surface opposite the circumferential surface, wherein the circumferential surface of the base comprises a plurality of flat portions arranged, along a circumferential axis, from a first end of the base to a second end of the base that is opposite the first end, and a plurality of chocky bars, wherein each of the plurality of chocky bars comprises a triangular tooth comprising a pair of triangular side surfaces, a top surface, and a bottom surface, wherein the top surface comprises a first portion inclined in a first direction and a second portion inclined in a second direction that is opposite the first direction, and wherein an interface between the first portion and the second portion is beveled, and a rectangular attachment plate comprising a top surface and a flat bottom surface, wherein the top surface of the rectangular attachment plate is brazed to the bottom surface of the triangular tooth, wherein the flat bottom surface of the rectangular attachment plate of each of the plurality of chocky bars is affixed to a respective one of the plurality of flat portions of the circumferential surface of the base, and wherein the bottom surface of the base of each of the plurality of wire guards is affixed to the circumferential surface of the rim between a respective pair of adjacent cleats in the subset of cleats.

16. A landfill compactor comprising a plurality of the wheel of claim 15.

17. A wire-guard kit for a compactor wheel, the wire-guard kit comprising:

a base comprising a circumferential surface, wherein the circumferential surface comprises a plurality of flat portions arranged from a first end of the base to a second end of the base that is opposite the first end; and a plurality of chocky bars, wherein each of the plurality of chocky bars comprises a triangular tooth comprising a pair of triangular side surfaces, a top surface, and a bottom surface, wherein the top surface comprises a first portion inclined in a first direction and a second portion inclined in a second direction that is opposite the first direction, and wherein an interface between the first portion and the second portion is beveled, and a rectangular attachment plate comprising a top surface and a flat bottom surface, wherein the top surface of the rectangular attachment plate is brazed to the bottom surface of the triangular tooth, wherein there is a space between adjacent chocky bars of the plurality of chocky bars.

* * * * *